(12) United States Patent
Kondo

(10) Patent No.: US 7,738,352 B2
(45) Date of Patent: *Jun. 15, 2010

(54) INFORMATION RECORDING MEDIUM

(75) Inventor: Tetsuya Kondo, Kanagawa-ken (JP)

(73) Assignee: Victor Company of Japan, Ltd., Yokohama (JP)

(*) Notice: Subject to any disclaimer, the term of this patent is extended or adjusted under 35 U.S.C. 154(b) by 32 days.

This patent is subject to a terminal disclaimer.

(21) Appl. No.: 12/213,539

(22) Filed: Jun. 20, 2008

(65) Prior Publication Data

US 2008/0259761 A1  Oct. 23, 2008

Related U.S. Application Data

(63) Continuation of application No. 11/443,739, filed on May 30, 2006, now Pat. No. 7,420,907, which is a continuation of application No. 11/155,135, filed on Jun. 16, 2005, now Pat. No. 7,190,662, which is a continuation of application No. 10/644,568, filed on Aug. 19, 2003, now Pat. No. 6,934,241, which is a continuation of application No. 09/852,441, filed on May 9, 2001, now Pat. No. 6,633,533.

(30) Foreign Application Priority Data

May 11, 2000  (JP) ............................. 2000-138168

(51) Int. Cl.
G11B 7/24 (2006.01)
B32B 3/02 (2006.01)
(52) U.S. Cl. .................... 369/275.1; 369/288; 428/64.4
(58) Field of Classification Search ... 369/275.1–275.5, 369/283, 287, 288; 428/64.1–64.5
See application file for complete search history.

(56) References Cited

U.S. PATENT DOCUMENTS 6,301,200 B1 * 10/2001 Aspen et al. ............. 369/275.2
6,633,533 B2 * 10/2003 Kondo ..................... 369/275.1

* cited by examiner

*Primary Examiner*—Ali Neyzari
(74) *Attorney, Agent, or Firm*—Louis Woo

(57) ABSTRACT

An optically detectable information recording medium is at least comprised of a substrate and a recording layer, wherein a surface of the recording layer opposite to another surface of the recording layer in contact with the substrate has a Root Mean Square roughness Rσ of less than 5 nm, and wherein the recording layer has highly reflective recording material selected from aluminum, silver, silicon, titanium, nickel, tantalum, molybdenium, iron, gold, copper, and their alloys.

6 Claims, 3 Drawing Sheets

INFORMATION RECORDING MEDIUM

CROSS-REFERENCE TO RELATED APPLICATIONS

This is a continuation of application Ser. No. 11/443,739, filed on May 30, 2006, which is a continuation of application Ser. No. 11/155,135, filed on Jun. 16, 2005, now U.S. Pat. No. 7,190,662, which is a continuation of application Ser. No. 10/644,568, filed on Aug. 19, 2003, now U.S. Pat. No. 6,934,241, which is a continuation of application Ser. No. 09/852,441, filed on May 9, 2001, now U.S. Pat. No. 6,633,533.

BACKGROUND OF THE INVENTION

1. Field of the Invention

The present invention relates to an information recording medium wherein a reproducing apparatus uses a relative motion with respect to the recording medium to read information, and particularly to an information recording medium wherein optical means are used to carry out recording and/or reproducing process.

2. Description of the Related Art

Currently there existed various systems which read information with relative motion of an information recording medium, and these systems use recording medium in shapes of a disk, a card, or a tape. The information recording medium in the form of a disk, especially with an optically recording and/or reproducing system, is heavily involved in our daily life. For example as a reproduction-only information recording medium which uses light with wavelength of 650 nm, there are DVD videos with pre-recorded visual information, DVD-ROMs with pre-recorded programs and such, and SACDs and DVD audios with pre-recorded audio information. In addition there are DVD-Rs as an addable recording/reproducing information recording medium using dye, DVD-RAMs and DVD-RWs as a recording/reproducing information recording medium using phase change, and ASMO, iD, and GIGAMO as a recording/reproducing information recording medium using magneto-optics.

Shortening the wavelength of a laser has been researched over the years in order to improve the recording density. The recording density is determined by MTF (spatial frequency) of an optical system, and it is expressed by the equation $\lambda/4$ NA ($\lambda$: reproduction wavelength, NA: numerical apertures of an objective lens). Since a pit length (or a mark length) at the reproduction limit is $\lambda/4$ NA, reducing $\lambda$ and increasing NA is necessary in order to increase the recording density.

Recently invented gallium nitride compound semiconductor light emitting element (Japanese Patent No. 2778405, for example) emits light near $\lambda=405$ nm. It seems to be a very important light-emitting element to significantly increase the recording density. The research for corresponding objective lens for the wavelength near the similar range is also progressing, especially with NA over 0.7 under development.

Development of such information recording medium reproducing apparatus with small $\lambda$ and NA over 0.7 is also progressing, and combination of these technologies gives hope to developing an optical disk with significantly increased recording capacity compared with the current DVDs.

A research to reduce the thickness of a transmission layer to transmit light, as NA becomes larger, to reduce aberration in case the information recording medium tilts is concurrently progressing.

SUMMARY OF THE INVENTION

It is an object of the present invention to provide an improved information recording medium.

In order to achieve the above object, the present invention provides, according to a first aspect thereof, an optically detectable information recording medium at least comprising: a substrate; and a recording layer, wherein a surface of said recording layer opposite to another surface of said recording layer in contact with said substrate has a Root Mean Square roughness R$\sigma$ of less than 5 nm, and wherein said recording layer has highly reflective recording material selected from aluminum, silver, silicon, titanium, nickel, tantalum, molybdenium, iron, gold, copper, and their alloys.

According to a second aspect of the present invention, there provided an optically detectable information recording medium at least comprising: a substrate; and a recording layer, wherein a surface of said recording layer opposite to another surface of said recording layer in contact with said substrate has a Root Mean Square roughness R$\sigma$ of less than 5 nm, and wherein said recording layer has phase change recording material selected from indium, antimony, tellurium, selenium, bismuth, vanadium, gallium, platinum, gold, silver, copper, tin, arsenic and their alloys.

According to a third aspect of the present invention, there provided a reproducing apparatus for an optically detectable information recording medium comprising at least a substrate and a recording layer, wherein a surface of said recording layer opposite to another surface of said recording layer in contact with said substrate has a Root Mean Square roughness R$\sigma$ of less than 5 nm, said reproducing apparatus at least comprising: a turntable for holding said information recording medium; a motor connected to said turntable for making said turntable move relatively; a light pickup for converging light on said information recording medium and for receiving reflected light from said information recording medium; a demodulator for demodulating a signal from said light pickup and for transmitting a demodulated signal to an interface; a servo controller for generating a focus servo signal to drive said light pickup and a tracking servo signal; an interface for transmitting said demodulated signal from said demodulator externally; and a controller for controlling said motor, servo controller, and interface, wherein said light pickup is at least composed of a laser emitting light having single wavelength between 370 to 430 nm and a photo detector.

Other object and further feature of the present invention will be apparent from the following detailed description when read in conjunction with the accompanying drawings.

DETAILED DESCRIPTION OF THE PREFERRED EMBODIMENTS

The inventor made an actual trial production of the reproducing apparatus with $\lambda$ approximately 405 nm (gallium nitride compound semiconductor light emitting element) and NA over 0.7. In addition a trial production of the information recording medium with high-density recording and, at the same time, with reduced thickness of a light transmission layer was also made. These two were then combined to attempt an actual reproduction, and it became clear that there were significant noises in the reproduction signals. The amount of the noise is more than anticipated from a reproduction with λ over 650 nm, such as DVDs. Even recording high-density signals on the information recording medium degrades reproduction signal S/N and reduces the signal quality tremendously. It is due to this noise that the recording density predicted from DVDs could not be established, and the recording density had to be compromised to lower levels.

It requires about 20 to 25 GB of recording capacity if, for example, 2.5 hours of high-definition television images were compressed into an MPEG format for recording. If universally distributed 120 mm disks, which are adopted as CDs and DVDs, were to have such recording capacity, compromising the recording density for the reasons mentioned previously is unacceptable.

Figure 5:
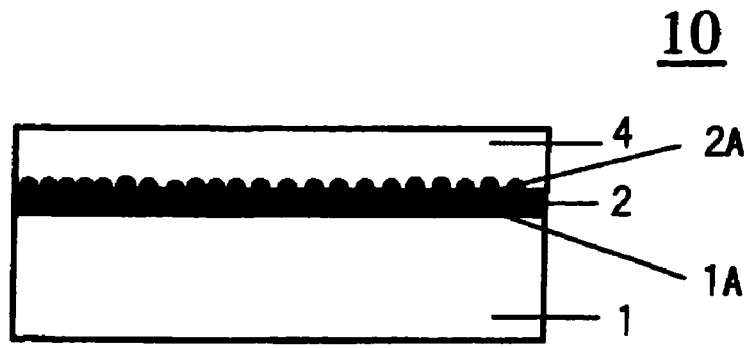
FIG. 5 shows a cross-sectional diagram of an ordinary information recording medium according to the prior art.

The inventor investigated and discovered the cause for the noise. FIG. 5 is a cross-sectional diagram showing the structure of a typical information recording medium. The information recording medium 10 is comprised of substrate 1, recording layer 2, and resin layer 4. The resin layer 4 is thinly constructed (thickness of 0.080 to 0.120 mm, for example) to correspond to high NA, and the light used for recording and/or reproducing is emitted through here.

Formation of the recording layer 2 by depositing on thin and flexible resin layer 4 causes deformation, so the deposit is done on the substrate 1 (thickness of 0.3 to 2.0 mm, for example). Therefore the substrate surface 1A that is in contact with the recording layer 2 becomes the starting point of the deposit and the surface 2A through predetermined thickness becomes the terminal point of the deposit.

In other words, the light used for recording and/or reproducing injects the recording layer surface 2A after passing through the resin layer 4. Predetermined functions (light absorption for recording or light reflection for reproduction) take place on the entire recording layer 2, then the light returns to a light pickup (not shown) after passing through the resin layer 4. The recording surface layer 2A is rough and with the selection of such structure, the surface roughness of the recording layer surface 2A superposition as a noise directly to the signals. Hence, the main reason for the noise is found on the recording layer surface 2A. The roughness has become so enhanced that it is at the level where it can not be disregarded following the reduction of the spot size created by λ of reproduction pickup and NA. That is, the roughness relative to the reproduction spot size becomes too significant. This roughness was the reason for the recording density not improving as much as predicted. The improvement of the recording layer 2 of the information recording medium is sought, and setting suitable degree of the surface roughness of the recording layer surface 2A and its design guidelines are desired.

First Embodiment

The invention is explained in detail using the accompanying drawings. The premises for this invention, the information recording medium 100, are an optical system with laser wavelength λ=370 to 430 nm (near 405 nm, for example) and numerical apertures in the objective lens NA between 0.7 to 0.9. Especially the noise element of the laser itself must be in RIN between −115 to −135 dB/Hz range. RIN represents a well-known laser noise measurement, Relative Intensity Noise.

Figure 1:
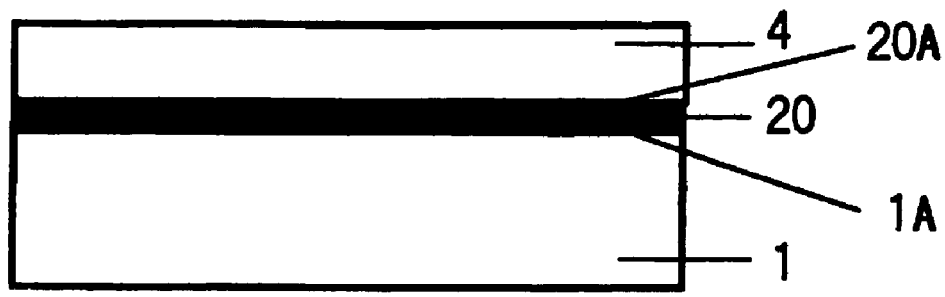
FIG. 1 shows a cross-sectional diagram of an information recording medium according to the first embodiment of the invention.

FIG. 1 is a cross-sectional diagram of the most basic structure of the invention, the information recording medium 100. The invention, the information recording medium 100, is comprised at least of the substrate 1, the recording layer 20, and the resin layer 4. The substrate 1 is composed of either resin composites, ceramics, or metals. Examples of the resin composite which can be used preferably include thermoplastic, thermosetting, or radiation curable resin (including ultraviolet curable resin and visible radiation curable resin) such as polycarbonate, polymethyl methacrylate, polystyrene, polycarbonate-polystyrene copolymer, polyvinyl chloride, alicyclic polyolefin, and polymethyl pentene. It could be a resin composite with metallic powder and/or ceramic powder combined. Examples of the ceramics include soda lime glass, silicate glass, borosilicate glass, or quartz glass. The thickness of the substrate 1 should be between 0.3 to 3 mm, preferably between 0.6 to 2 mm.

If the information medium is a reproduction-only information recording medium, then the recording layer 20 has highly reflective recording material. If it is a reproducing/recording type information recording medium, then according to its recording or reproducing principle, dye, phase change, or magneto-optical material is used. The thickness preferably used is between 20 to 200 nm.

Highly reflective recording material with reflectivity over 70%, preferably over 80%, at the reproducing wavelength λ can be used. Among the choices are metals such as aluminum, silver, silicon, titanium, chromium, nickel, tantalum, molybdenum, iron, gold, copper and their alloys (The alloys include oxides, nitrides, carbides, sulfides, and fluorides). Aluminum or Silver alloys are especially preferable for the use.

Specific examples of the dye material for a dye recording include cyanine dye, phthalocyanine dye, naphtalocyanine dye, azo dye, naphtoquinone dye, fulgide dye, polymethyne dye, and acridine dye.

Specific examples of the phase change recording material include alloys of indium, antimony, tellurium, selenium, germanium, bismuth, vanadium, gallium, platinum, gold, silver, copper, tin, and arsenic (The alloys include oxides, nitride, carbides, sulfides, and fluorides). It is especially preferable to use GeSbTe, AgInSbTe, or CuAlTeSb. Using the laminating film of indium alloy and tellurium alloy for the recording layer 20 is acceptable as well.

Specific examples for the magneto-optical recording material include alloys of terbium, cobalt, iron, gadolinium, chromium, neodymium, dyspromium, bismuth, palladium, samarium, holmium, praseodymium, manganese, titanium, erbium, ytterbium, lutetium, and tin (The alloys include oxides, nitride, carbides, sulfides, and fluorides). It is especially preferable to use alloys with transitional metals and rare-earth elements, such as TbFeCo, GdFeCo, or DyFeCo. In addition using alternating laminating films of cobalt and platinum for the recording layer 20 is acceptable as well.

It is also acceptable to laminate a combination of support films, such as silicon, tantalum, zinc, magnesium, calcium, aluminum, chromium, or zirconium alloys (including oxides, nitrides, and carbides) and highly reflective films (aluminum, gold, silver, etc.) in order to improve the reproduction output, re-writing limits, recording stability, etc.

The main point of this invention is to set the surface roughness of the surface 20A of the recording layer 20, in contact with the resin layer 4, under the predetermined value, specifically Rσ under 5 nm and preferably under 2 rm. Rσ is known as "root mean square roughness", defined by Australian standard AS1965-1977. Among several definitions to express surface roughness, this expression has the compatibility with the reproduction principle of an information recording medium that reproduces optical phase differences, hence it is the optimum expression to equalize the surface 20A as a noise. Prior to accepting this standard, the inventor confirmed the strong correlation between this Rσ and the noise output of the information recording medium. More details regarding this definition is explained on page 18 of JIS-B0601-1982.

For the resin layer 4, thermosetting resins, several radiation curable resins (including ultra-violet curable resins and visible radiation curable resins), electronic beam curable resins, humidity curable resins, multi-liquid mixture curable resins, and thermoplastic resins can be used. The thickness range of the resin layer 4, considering previously discussed optical parameters, lies between 0.080 to 0.120 mm. The maximum variations on the surface of the information recording medium are ±0.003 mm, preferably ±002 mm, and under ±001 would even be better. The optical characteristic of the resin layer is choosing a material wherein the transmissivity is 60% or more, and preferably 80% or more, with the reproducing light and/or the recording light at wavelength λ. In addition, the double pass birefringence, with the reproducing light or the recording light at wavelength λ, is under ±20 nm, and preferably under ±15 nm. The resin layer 4 forms with respect to the recording layer 20 by fusion or adhesion. For this purpose, it is acceptable for the layer 4 to be of multiple layers of laminations.

The invention of the information recording medium 10 was explained above using FIG. 1. The invention is an information recording medium comprised of at least the substrate 1, the recording layer 20 with the surface 20A in contact with the resin layer 4, and the resin layer 4. Its characteristic is the surface roughness of the surface 20A under a predetermined value, or Rσ is under 5 nm. Such roughness is usually not considered upon depositing the recording layer 20, but this invention is established by selecting materials and deposit conditions to achieve such value. For example with the case of a reproduction-only information recording medium, aluminum is ordinarily used. An aluminum alloy with an addition of small amounts of elements prevents enlargement of particles and keeps the surface roughness within the predetermined value.

Second Embodiment

Figure 2:
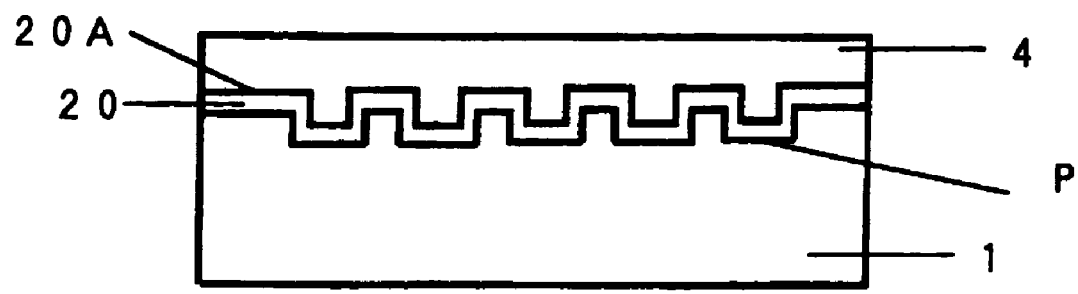
FIG. 2 shows a cross-sectional diagram of an information recording medium according to the second embodiment of the invention.

The micro pattern P may be formed on the surface 20A, in contact with the recording layer 20 of the substrate 1, as an application of this information recording medium 10 as shown in FIG. 2. The micro pattern P is a track pattern formed either in straight lines, concentric circles, or spirals, continuous grooves as seen macroscopically, intermittent pits as seen microscopically, or combinations of the above. The size is determined so that, for example, the groove widths and/or the pit widths lies between 0.05 to 1.0 μm.

Other Embodiment

Though not shown in figures it is acceptable to prepare two information recording medium 100, either with structures of FIG. 1 or FIG. 2, mutually face the substrates 1, and stick them together. It is also acceptable to add another set of layers of the recording layer 20 and the resin layer 4 on top of the resin layer 4 of the information recording medium 100 with structures of FIG. 1 or FIG. 2. This would approximately double the capacity of the information recording medium 100.

Information Recording Medium Reproducing Apparatus

The detailed structure of the information recording medium reproducing apparatus of this invention, and the reproduction operation is explained next. shows the typically illustrated information recording medium reproducing apparatus. In other words, it is the information recording medium reproducing apparatus 200 loaded with the information recording medium 100 structurally mentioned above, and it has the reproducing means to reproduce the information recorded. The reproducing means comprises of at least the light pickup 50, the motor 51, the servo section 52, the turntable 53, the demodulator 54, the interface (I/F) 55, and the controller 60.

The light pickup 50 comprises of at least a light emitted at single wavelength λ between 370 to 430 nm, a laser with a noise component RIN between −115 to −135 dB/Hz, and numerical apertures NA between 0.7 to 0.9. They help form the convergence reproduction light. The light pickup 50 also has a built-in photo detector to be able to gather the reflective light from the information recording medium 100.

Figure 3:
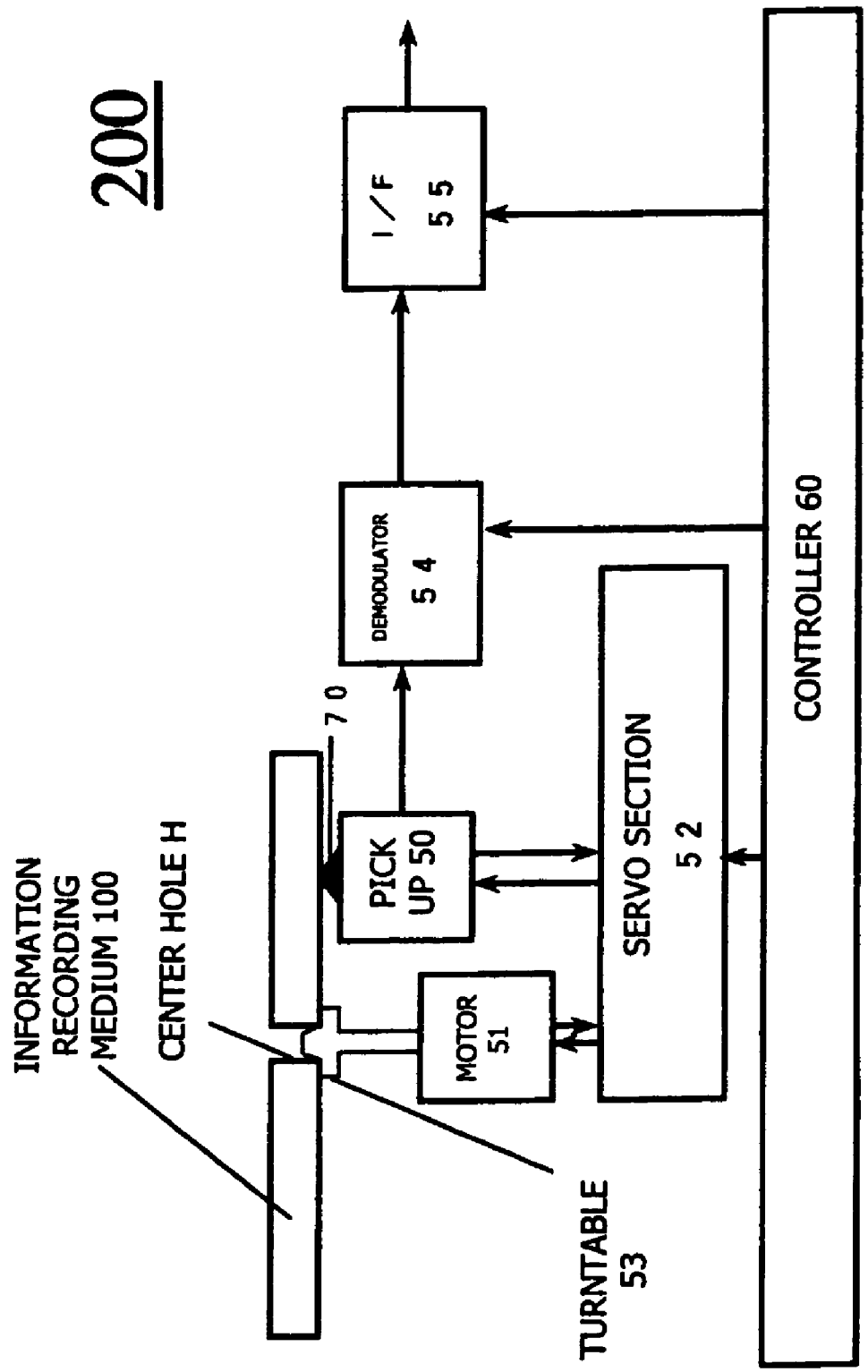
FIG. 3 shows a block diagram of an information recording medium reproduction apparatus related to the first embodiment of the invention.

Basic structures and reproducing operations of the information recording medium reproducing apparatus 200 is explained using FIG. 3. The light pickup 50 condenses the convergence light beam 70 to the information recording surface of the information recording medium 100, detects the recording signals by gathering the reflecting light, and then sends the signals to the demodulator 54. Focus-error signals and tracking-error signals from the reflecting light are sent to the servo section 52. The servo section 52 then creates focus-servo signals and tracking-servo signals, controlled by the controller 60, and sends them to the light pickup 50. The servo section 52 creates rotating-servo signals as well, which is sent to the motor 51. The motor 51 is connected to the turntable 53 and the turntable 53 and the information recording medium 100 are connected by fitting in the center hole H. The motor 51, through the turntable 53, holds the information recording medium 100 and provides relative motion necessary for reproduction.

The demodulator 54 demodulates the recording signals, corrects the errors when necessary, then sends the acquired data stream to the interface (I/F) 55. Then it sends the signals outside based on the instructions from the controller 60. It is acceptable to connect the signal output to an external output terminal not shown in figures, or directly connect to a displaying apparatus, a speaker apparatus, or a printing apparatus.

The information recording medium reproducing apparatus 200 is loaded with the information recording medium 100, and they are designed to conform with the reproduction light produced by a single-wavelength light emitted at λ between 370 to 430 nm, a laser with noise component RIN between −115 to −135 dB/Hz, and numerical apertures NA between 0.7 to 0.9. The information recording medium 100 is preferably reproduced under these conditions. The turntable 53 and the information recording medium 100 are connected by fitting in the center hole H, but this connection can be fixed or detachable, which connects/detaches freely.

Details of the invention are further explained based on the corresponding trial products of the information recording medium 100.

Sample 1 of Trial Product

The disk-shaped information recording medium 100, 120 mm in diameter with structures of FIG. 2, is prepared as a reproduction-only information recording medium. Thermoplastic resin polycarbonate, 1.1 mm in thickness, is used as the substrate 1. Single frequency signal (pit) with pit length of 220 nm is recorded spirally as the micro pattern P on the surface. The recording layer 20 is formed by deposit using sputtering method on the micro pattern P. The surface roughness Rσ of the surface 20A of the recording layer 20 is measured using an atomic force microscope (roughness corresponding to the micro pattern P is disregarded, however). Thermoplastic resin polycarbonate sheet and ultraviolet-curable resin are prepared for the resin layer 4. The recording layer surface 20A and the polycarbonate are piled through the ultraviolet-curable resin for ultraviolet curing to complete the information recording medium 100.

By repeating the process with different materials, various metals with reflectivity over 80% at λ, for the recording layer 20, several samples of the information recording medium 100 were prepared.

The information recording medium reproducing apparatus 200 with the light pickup 50, comprised of a laser illuminating at λ of 405 nm, a noise component RIN at −115 dB/Hz, and numerical apertures NA at 0.7 is prepared. The state of the information recording medium 100 loaded to the reproduction apparatus 200 is shown in FIG. 3. Reproduction of the micro pattern P signals is tested by spinning the information recording medium 100. The reproduction signals are then measured for C/N (carrier-to-noise ratio) using a spectral analyzer with resolving bandwidth set at 30 kHz.

Figure 4:
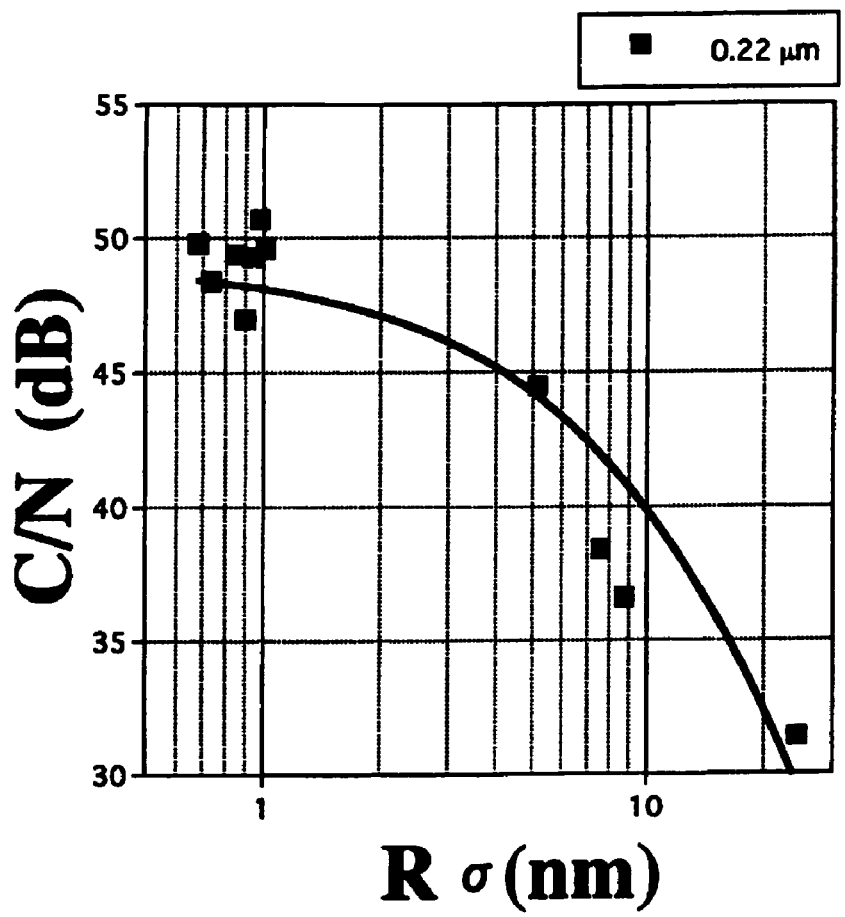
FIG. 4 shows a relationship between surface roughness R$\sigma$ of a recording layer surface of an information recording medium and C/N.

FIG. 4 shows the relationship between the surface roughness Rσ, of the recording layer surface 20A, and C/N for each sample. There is a strong correlation between Rσ and C/N, as shown in the figure, which can be expressed in a binary power series. Areas of small Rσ provide sufficient C/N but at certain values, or at Rσ over 5 nm, C/N tends to digress drastically. As a matter of a fact C/N can not extract the signals at 40 dB and the value over 45 dB becomes desirable, so even from this standpoint Rσ should at least be less than 5 nm.

Considering these tendencies, partially revised information recording medium 100 is shown in the embodiment that follows.

Sample 2 of Trial Product

D8-15 modulation (noted in Japanese Patent Application No. 2000-020171) recorded spirally is used as the micro pattern P of the information recording medium 100. The modulation signals are integral multiple length signals from 3T to 11T, and the shortest pit 3T is set at 220 nm in length. The interval of the spiral track is 341 nm. The physical dimension for a disk with 120 mm in diameter would provide 20 GB of recording capacity. An aluminum alloy A6061 is used as the recording layer 20, formed 45 nm in layer thickness by sputtering in argon gas. The surface roughness Rσ of the surface 20 A was 0.95 nm at this time (the roughness of the micro pattern P is disregarded, however).

By loading this information recording medium 100 to the information recording medium reproduction apparatus 200 to attempt reproduction, signal outputs were 79% 11T modulation and 23% 3T modulation. These signals were decoded using an error selecting equalizer of Japanese Patent Application No. 11-291634/1999 (equal to U.S. patent application Ser. No. 09/468,130 filed on Dec. 21, 1999 and European Patent Application No. 99125733.8 filed on Dec. 23, 1999) and an adaptive Viterbi decoder of Japanese Patent Application No. 11-155673/1999 (equal to U.S. patent application Ser. No. 09/438,297 filed on Nov. 12, 1999 and European Patent Application No. 99309596.7 filed on Nov. 30, 1999). The signals output were consistently at low error rate of $5 \times 10^{-5}$.

The measurement of an angle (a tilt margin) for the system breakdown is measured by tilting the information recording medium 100, and there were latitudes of ±0.6 degrees radial adjusting and ±0.5 degrees tangential adjusting. These results would provide sufficient degree of margin even after considering sporadic productions of the information recording medium 100 and/or the turntable 53 and curvature generations in user environment.

Comparison Sample

The structural elements are identical to the Sample 2 except for 90 nm in layer thickness of pure aluminum as the recording layer 20. The surface roughness of the surface 20A was 5.5 nm (roughness corresponding to the micro pattern P is disregarded, however).

The reproducing signal had high error rate of $3.5 \times 10^{-4}$ and showed tendencies to intermittently halt the decoding process. It is therefore actually at the level of a non-working system. Slight tilt of the information recording medium 100 significantly aggravated the error rate as well.

Embodiments of the invention have been discussed. Based on the concept of the invention, alternative forms of the application are possible. The structural elements mentioned throughout may be mutually exchanged within the boundaries not impeding the invention contents. For example, previously described information recording medium 100 was in a disk-form, but it could be in the form of a card or a tape. The information recording medium 100 may be attached inside a cartridge. The size of the disk is not limited to 120 mm in diameter, but rather may be 40 to 300 mm in diameter; or 51, 65, 80, 88, 130, 200, 300 mm in diameter, for example.

The signals recorded on the micro pattern P are not limited to the D8-15 modulation. Several modulation signals of so-called (d,k) codes may be used instead. Both fixed-length codes and variable-length codes are acceptable. Both mark-edge recordings and mark-position recordings are effective. A mark-edge recordings recording and a type of fixed-length codes, (2.10) RLL modulation (8/16 modulation or 8/17 modulation, for example) or a mark-edge recording and a type of variable-length codes, (2.7) modulation or (1.7) modulation, are especially possible for the use.

According to the aspect of the present invention, there provided an information recording medium, limiting the surface roughness Rσ, of a recording layer surface of the information recording medium, under 5 nm controls the reproduction signal noise, enables recording of over 20 to 25 GB of information onto an ordinary sized information recording medium, and materializes highly densified recording medium.

What is claimed is:

1. An optically detectable information recording medium at least comprising a substrate; and
    a recording layer,
        wherein a surface of said recording layer opposite to another surface of said recording layer in contact with said substrate has a Root Mean Square roughness Rσ of less than 5 nm, and
        wherein said recording layer has highly reflective recording material selected from aluminum, silver, silicon, titanium, nickel, tantalum, molybdenium, iron, gold, copper, and their alloys.

2. The information recording medium in accordance with claim 1, wherein said alloys include their oxides, nitrides, carbides, sulfides and fluorides.

3. An optically detectable information recording medium at least comprising: a substrate; and
a recording layer,
wherein a surface of said recording layer opposite to another surface of said recording layer in contact with said substrate has a Root Mean Square roughness $R\sigma$ of less than 5 nm, and
wherein said recording layer has phase change recording material selected from indium, antimony, tellurium, selenium, bismuth, vanadium, gallium, platinum, gold, silver, copper, tin, arsenic and their alloys.

4. The information recording medium in accordance with claim 3, wherein said alloys include their oxides, nitrides, carbides, sulfides, and fluorides.

5. The information recording medium in accordance with claim 3, wherein said alloys are GeSbTe, AgInSbTe, or CuAlTeSb.

6. A reproducing apparatus for an optically detectable information recording medium comprising at least a substrate and a recording layer,
wherein a surface of said recording layer opposite to another surface of said recording layer in contact with said substrate has a Root Mean Square roughness $R\sigma$ of less than 5 nm,
said reproducing apparatus at least comprising:
a turntable for holding said information recording medium;
a motor connected to said turntable for making said turntable move relatively;
a light pickup for converging light on said information recording medium and for receiving reflected light from said information recording medium;
a demodulator for demodulating a signal from said light pickup and for transmitting a demodulated signal to an interface;
a servo controller for generating a focus servo signal to drive said light pickup and a tracking servo signal;
an interface for transmitting said demodulated signal from said demodulator externally; and
a controller for controlling said motor, servo controller, and interface, wherein said light pickup is at least composed of a laser emitting light having single wavelength between 370 to 430 nm and a photo detector.

* * * * *